United States Patent [19]

Bhattacharya

[11] Patent Number: 5,055,702
[45] Date of Patent: Oct. 8, 1991

[54] METHOD AND APPARATUS FOR CONTROLLING APPLICATION OF ELECTRICAL POWER

[76] Inventor: Amor Bhattacharya, 3205 Deep Valley Trail, Plano, Tex. 75075

[21] Appl. No.: 397,992

[22] Filed: Aug. 24, 1989

[51] Int. Cl.[5] ............................................. H02J 3/00
[52] U.S. Cl. ..................................... 307/29; 307/9.1; 307/41; 307/80; 307/115; 361/189; 361/191
[58] Field of Search ................... 307/9.1, 10.1, 11, 18, 307/19, 23, 29, 38, 39, 41, 43, 44, 64–66, 70, 80, 85–87, 112–116, 139–141.4; 361/189–193

[56] References Cited

U.S. PATENT DOCUMENTS

| | | | |
|---|---|---|---|
| 4,356,402 | 10/1982 | Morimoto et al. | 307/19 |
| 4,617,472 | 10/1986 | Slavik | 307/9.1 |
| 4,817,862 | 4/1989 | Amor Bhattacharya | 236/10 |

*Primary Examiner*—A. D. Pellinen
*Assistant Examiner*—David Osborn

[57] ABSTRACT

A method and apparatus for controlling application of electrical power from a selected one of a first and a second source of electrical power to a first and a second energy consuming device is disclosed and comprises a first and second switching device connected between the first and second sources of electrical power and the first and second energy consuming devices to control which energy consuming device is energized and in what manner it is energized from either the first or second source of electrical power. A third switching device is connected to the first and second switching devices to control the position of the first and second switching devices. A fourth switching device is connected to the first and third switching devices to control the position of the first switching device through the third switching device.

33 Claims, 5 Drawing Sheets

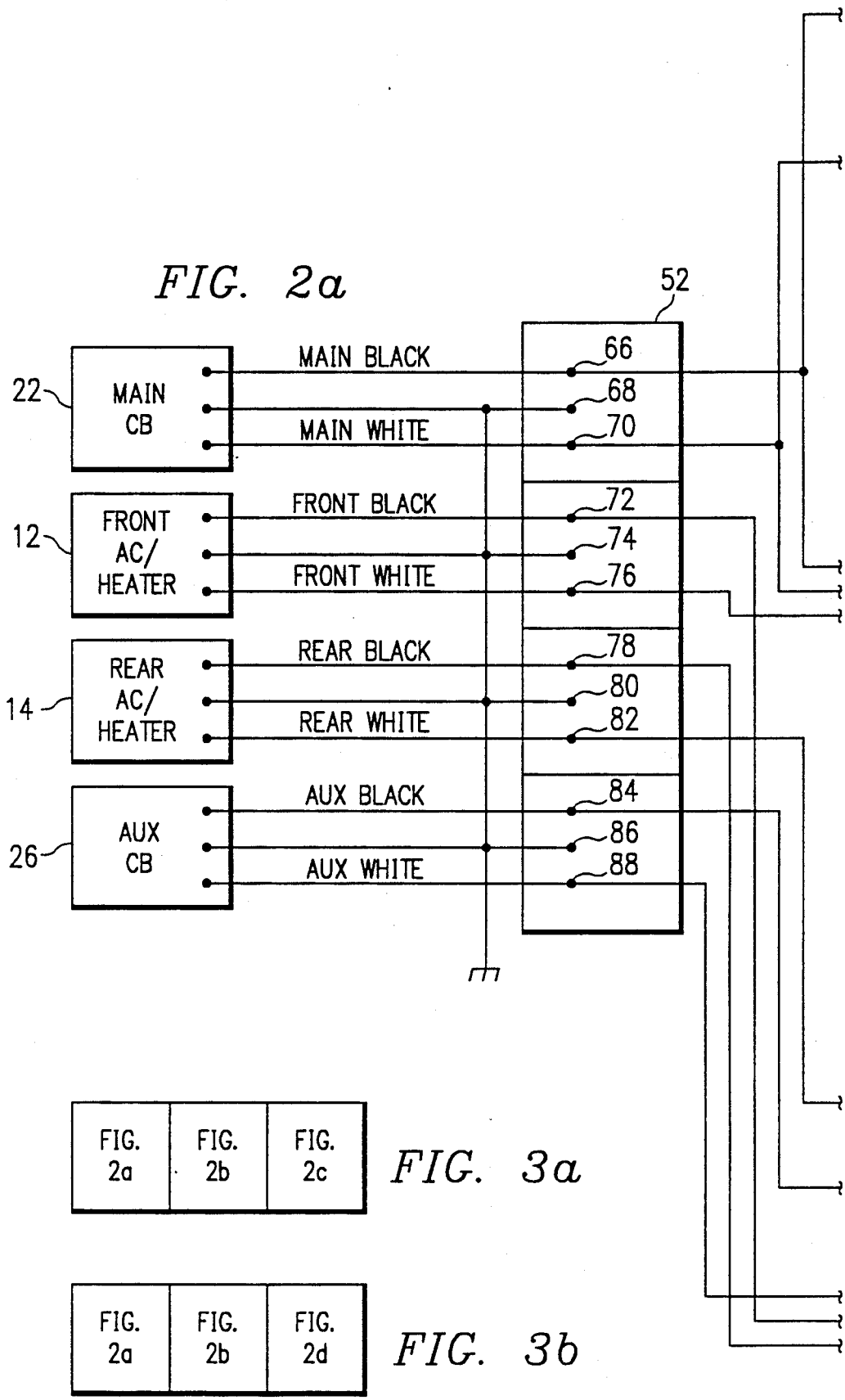

METHOD AND APPARATUS FOR CONTROLLING APPLICATION OF ELECTRICAL POWER

BACKGROUND OF THE INVENTION

1. Field of the Invention

The present invention relates in general to a method and apparatus for controlling the application and removal of AC power to energy consuming devices. More particularly, but not by way of limitation, it relates to a method and apparatus for applying and removing either of two power sources to two separate energy consuming devices in a predetermined choice of combinations. 2. Description of the Prior Art In recent years, with the increased emphasis on leisure time, recreation, vacation and the enjoyment thereof, more and more people are investing in motor homes or motor-home type of travel vehicles.

Although the present invention is applicable to the control of AC power applied to various energy consuming devices, it has been found to be particularly useful in the control of the application and removal of AC power from either the power source provided at a trailer-park type location or the on-board generator of a motor home to at least two separate energy consuming devices (such as two air conditoners or two combination air conditioner/heaters) in a motor home. Therefore, without limiting the applicability of the invention to "air conditioners in a motor home", the invention will be described in this environment. It will be appreciated that in this application the word "motor home" will include travel trailers and any type of recreational vehicles, fifth wheels and mobile homes which have at least two air condititoners or air conditioner/heaters and an on-board generator.

The great majority (if not all) of camp grounds and/or trailer parks having hook-up facilities for motor homes provide an AC service outlet for each site which comprises 110 volts with 20-30 amps service. This is insufficient amperage to allow the owner of the motor home to operate two air conditioners at the same time. Most motor homes have a front air conditioner and a rear air conditioner. The owner of the motor home can only operate one of the air conditioners at a time. The motor home electrical system is provided with a manual selector switch which allows the owner of the motor home to manually select which of the two air conditioners will be operating when the motor home is connected to the AC service outlet provided at the trailer park. If the owner has initially selected to operate the front air conditioner, then to operate the rear air conditioner instead of the front air conditioner, he has to manually change the manual selector switch in order to operate the rear air conditioner. Some motor homes do not have a manual selector switch and the electrical power is applied simultaneously to both the front and rear air conditioners. The owner of the motor home has to manually switch one or the other air conditioners on and/or off at the individual air conditioner units.

The present invention is intended to provide a solution to various prior art deficiencies which include the inability of the owner of the motor home to operate both the front and rear air conditioners of the motor home without manually switching to a designated air conditioner when the motor home is hooked-up to the AC service outlet at the trailer park for motor homes. It is presently difficult, if not impossible, to adequately cool the entire motor home while it is hooked up to the AC service outlet at the trailer park for motor homes. In order to assure adequate cooling of the motor home, the owner must manually switch the AC power from the front air conditioner to the rear air conditioner and then some time later must then manually switch the AC power from the rear air conditioner to the front air conditioner.

SUMMARY OF THE INVENTION

A method and apparatus for controlling application of electrical power from a selected one of a first and a second source of electrical power to a first and a second energy consuming device is disclosed and comprises a first and second switching device connected between the first and second sources of electrical power and the first and second energy consuming devices to control which energy consuming device is energized and in what manner it is energized from either the first or second source of electrical power. A third switching device is connected to the first and second switching devices to control the position of the first and second switching devices. A fourth switching device is connected to the first and third switching devices to control the position of the first switching device through the third switching device. When the first source of electrical power is selected, either the first energy consuming device may be energized, or the second energy consuming device may be energized, or the application of the first source of electrical power is cycled between the first and second energy consuming devices for predetermined periods of time. When the second source of electrical power is selected, either both of the energy consuming devices are energized, or the second energy consuming device is energized or the application of the second source of electrical power is cycled between the first and second energy consuming devices for predetermined periods of time.

Among the advantages offered by the present invention is the ability of the operator of the motor home to choose which air conditioner is on and the time they are on so the operator may have both the front and rear of the motor home cooled at the same time, only the rear of the motor home cooled or both the front and rear of the motor cooled by cycling the on periods of the front and rear air conditioners thereby decreasing the wattage required for the on-board generator.

Examples of the more important features and advantages of the invention have thus been summarized rather broadly in order that the following detailed description thereof may be better understood and in order that the contribution to the art may be better appreciated. There are, of course, additional features of the invention which will be described hereinafter and which will also form the subject of the claims appended hereto. Other features of the invention will become apparent with reference to the following detailed description of a presently preferred embodiment thereof in connection with the accompanying drawing in which:

BRIEF DESCRIPTION OF THE DRAWING

FIGS. 2a–2c, when arranged as shown in FIG. 3a, is a simplified schematic diagram of the present invention;

FIG. 2d is a simplified pictoral of the contacts of the remote dual control switch means of the present invention;

FIGS. 2a, 2b and 2d, when arranged as shown in FIG. 3b, is a simplified schematic diagram of another embodiment of the present invention;

DESCRIPTION OF THE PREFERRED EMBODIMENT

Figure 1:
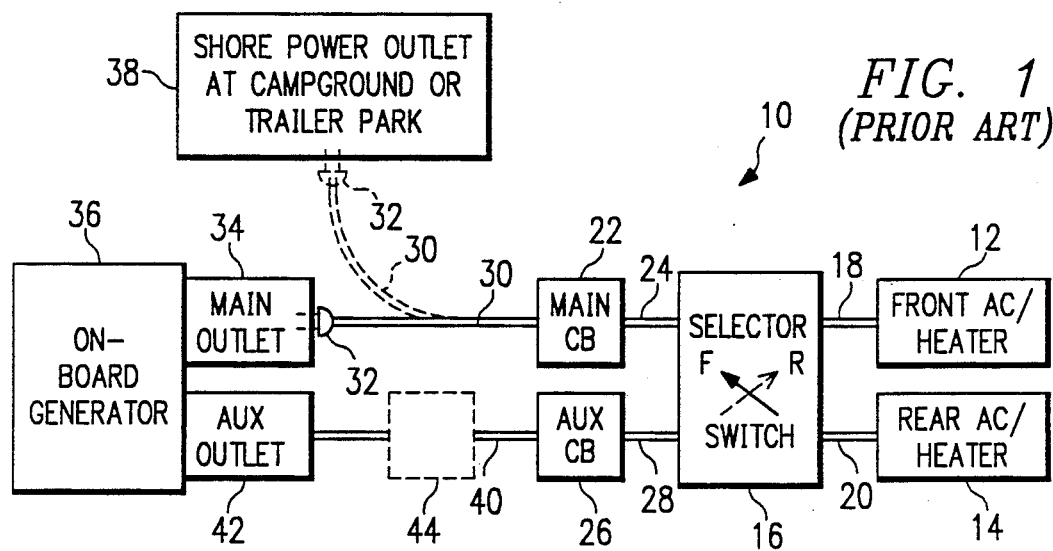
FIG. 1 is a simplified schematic diagram of a portion of the electrical wiring system of the prior art wiring of a motor home.

Referring now to the drawing wherein like reference numerals designate like or corresponding elements throughout the several views and more particularly to FIG. 1, there is shown the prior art wiring 10 for a typical motor home which has a first energy consuming device 12, which is an air conditioner or a combination air conditioner and heater, which is located in the front portion of the motor home. A second energy consuming device 14, which is also an air conditioner or a combination air conditioner and heater, is located in the rear portion of the motor home. The first energy consuming device 12 is connected to selector switch 16 by electrical cable 18 while second energy consuming device 14 is connected to selector switch 16 by electrical cable 20. Selector switch 16 is connected to the main circuit breaker 22 by electrical cable 24 and to the auxiliary circuit breaker 26 by electrical cable 28. Electrical cable 30 is connected to main circuit breaker 22 and includes an electrical plug or connector 32 on the end furthest from the main circuit breaker 22. Electrical plug or connector 32 is configured to plug into either the main outlet socket 34 of the on-board generator 36 of the motor home or the shore power outlet 38 provided at the parking site at the campground or trailer park. Electrical cable 40 is connected (hard-wired without a plug) between the auxiliary circuit breaker 26 and the auxiliary outlet socket 42 of the on-board generator 36. The 110, single phase, AC voltage (MAIN) supplied by the trailer park at the shore power outlet 38 is the first power source while the two separate 110, single phase, AC voltages (MAIN and AUXILIARY) supplied by the on-board generator 36 is the second power source.

When the motor home is parked at the trailer park, the owner or operator of the motor home will plug electrical plug or connector 32 into the shore power outlet 38 and with selector switch 16 positioned in a first position (F), the power coming through the main circuit breaker 22 is connected to the first energy consuming device 12 and the second energy consuming device 14 is connected to the auxiliary circuit breaker 26 which does not have any power applied to it since the on-board generator 36 will not be activated or operating. In some of the motor homes, a relay or switching device 44 is installed in electrical cable 40 so the auxiliary power is disconnected when electrical plug or connector 32 is plugged into the shore power outlet 38 rather than the main outlet socket 34 on the on-board generator 36. With selector switch 16 positioned in a second position (R), the power coming through the main circuit breaker 22 is connected to the second energy consuming device 14 and the first energy consuming device 12 is not connected to either circuit breaker.

When the motor home is parked at a remote site which does not have a power source for connection to the motor home or if the motor home is traveling on the road, then the owner or operator of the motor home must activate the on-board generator 36 (which is driven by a gasoline engine) and plug the electrical plug or connector 32 into the main outlet socket 34 on the on-board generator 36. Then with the selector switch 16 positioned in the first position (F), the power coming through the main circuit breaker 22 is connected to the first energy consuming device 12 and the power coming through the auxiliary circuit breaker 26 is connected to the second energy consuming device 14. With the selector switch 16 positioned in a second position (R), the power coming through the main circuit breaker 22 is connected to the second energy consuming device 14 and the first energy consuming device 12 is not connected to either circuit breaker.

In summary of the prior art, the motor home operator may only operate either the first energy consuming device 12 (front air conditioner) or the second energy consuming device 14 (rear air conditioner) when connected to the shore power at the trailer park. The motor home operator may operate both the first and second energy consuming devices 12, 14 at the same time or can operate only the second energy consuming device 14 when connected to and operating from the on-board generator 36.

Referring to FIGS. 2a, 2b, 2c, 3a and 4 generally designated by the reference numeral 50 is control apparatus that is constructed in accordance with the present invention. In the motor home, selector switch 16 is removed and replaced by control apparatus 50 which comprises terminal block 52 (FIG. 2a), power supply 54, timer means 56, first switch means 58, second switch means 60, third switch means 62 (FIG. 2c) and fourth switch means 64.

With reference to FIG. 2a, connections between the main circuit breaker 22, the auxiliary circuit breaker 26, the first energy consuming device 12 (front air conditioner) and the second energy consuming device 14 (rear air conditioner) and control apparatus 50 are made at and through terminal block 52. The electrical wires from main circuit breaker 22 are connected to terminals 66, 68 and 70. The electrical wires from the first energy consuming device (front air conditioner) 12 are connected to terminals 72, 74 and 76. The electrical wires from the second energy consuming device (rear air conditioner) 14 are connected to terminals 78, 80 and 82. The electrical wires from the auxiliary circuit breaker 26 are connected to terminals 84, 86 and 88.

Figure 2B:
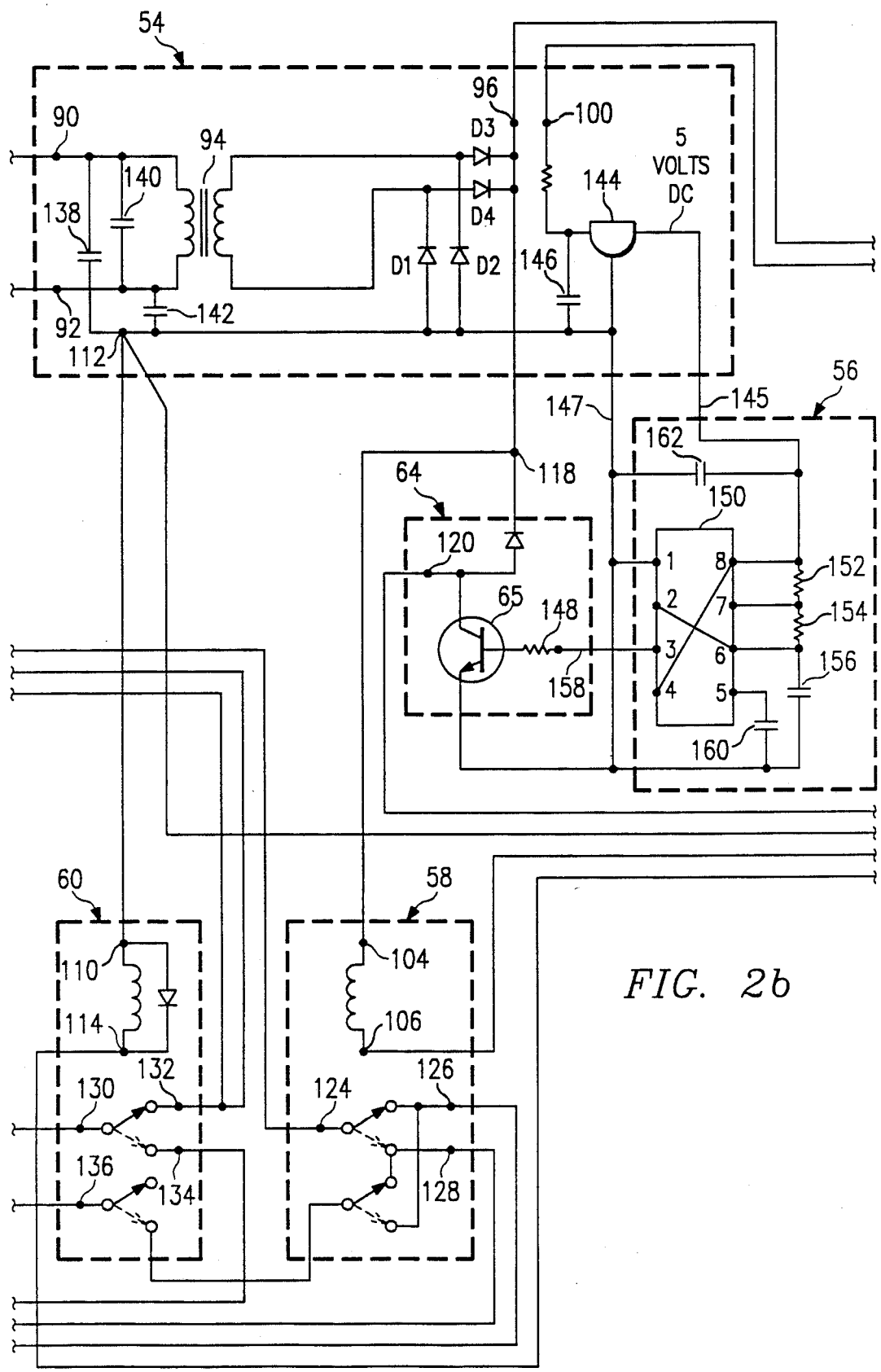
Figures 2C, 2D:
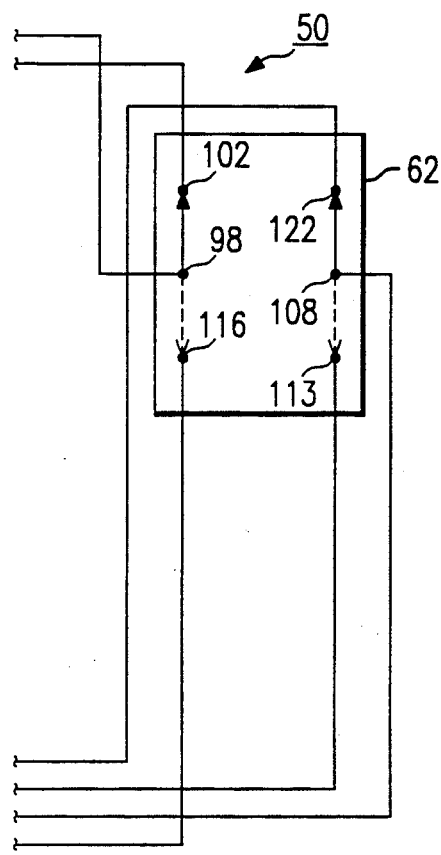
Figure 4:
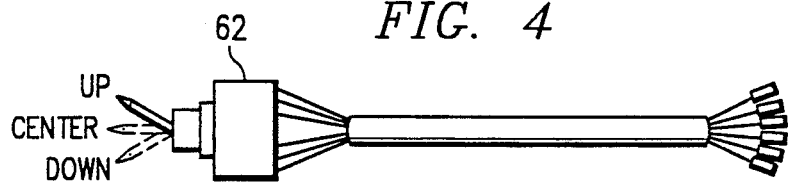
FIG. 4 is a simplified pictorial of a remote single control switch means of the present invention.

With reference to FIGS. 2a, 2b and 2c, terminal 90 of power supply 54 is connected to terminal 66 (MAIN black) of terminal block 52 while terminal 92 is connected to terminal 70 (MAIN white) thereby suppling 110 volts AC to input transformer 94 of power supply 54 when voltage is supplied to main circuit breaker 22 from either the shore power outlet 38 or the main outlet socket 34 on the on-board generator 36. Terminal 96 (12 volt DC positive output terminal) of power supply 54 is connected to terminal 98 of third switch means 62 (FIG. 5) while terminal 100 of power supply 54 is connected to terminal 102 of third switch means 62. Terminal 112 (negative output terminal) of power supply 54 is connected to terminal 113 of third switch means 62. In the preferred embodiment, third switch means 62 comprises a double-pole, double-throw, center-off switch which may be positioned in either a first position (switch lever in the up position), a second position (switch lever in the center position) and a third position (switch lever in the down position). It will be appreciated that a solid state switch or any applicable switching device could be used.

Terminal 104 of first switch means 58 is connected to terminal 96 of power supply 54. Terminal 106 of first switch means 58 is connected to terminal 108 of third switch means 62. In the preferred embodiment, first switch means 58 comprises a double-pole, double-throw relay. It will be appreciated that a solid state switch or any applicable switching device could be used.

Terminal 110 of second switch means 60 is connected to terminal 112 (negative output terminal) of power supply 54. Terminal 114 of second switch means 60 is connected to terminal 116 of third switch means 62. In the preferred embodiment, second switch means 60 comprises a double-pole, double-throw relay. It will be appreciated that a solid state switch or any applicable switching device could be used.

Terminal 118 of fourth switch means 64 is connected to terminal 96 of power supply 54. Terminal 120 of fourth switch means 64 is connected to terminal 122 of third switch means 62. In the preferred embodiment, fourth switch means 64 comprises a transistor 65.

With reference to the connections to the relay or switch contacts of first and second switch means 58 and 60, terminals 124, 126 and 128 of first switch means 58 are connected to terminals 66 (MAIN black), 78 (rear black) and 72 (front black) of terminal block 52, respectively. Terminals 130, 132, 134 and 136 of second switch means 60 are connected to terminals 82 (rear white), 70 (MAIN white) and 76 (front white), 88 (AUX white) and 84 (AUX black) of terminal block 52, respectively.

During operation of the present invention, the position of third switch means 62 determines the position of first and second switch means 58, 60 whose positions determine how the power source is connected to the first and second energy consuming devices. When third switch means 62 is in a first position (switch lever in the up position), both first and second switch means 58, 60 are positioned to a first position which is as shown in FIG. 2b with the switch arms shown in phantom. When third switch means 62 is in a second position (switch lever in the center position), both first and second switch means 58, 60 are positioned to a second position which is as shown in FIG. 2b with the switch arms shown in solid line. When third switch means 62 is in a third position (switch lever in the down position), second switch means 60 is positioned in the second position and the position of the first switch means 58 is determined by the position/condition of fourth switch means 64 which will be discussed below.

The operation of the basic configuration of the control apparatus 50 will be discussed with reference to FIGS. 2a, 2b, 2c, 3a, and 4 and will be first discussed when the electrical plug or connector 32 is plugged into the shore power outlet 38 and the on-board generator 36 is not activated. Then the operation will be discussed when the electrical plug or connector 32 is plugged into the main outlet socket 34 on the on-board generator 36 and the on-board generator 36 is activated.

When shore power is used, the 110 volt AC from the shore power outlet 38 is applied through main circuit breaker 22 to terminal block 52 and to terminals 90 and 92 of power supply 54 and to the primary of transformer 94 (step-down transformer) and the input filter capacitors 138, 140 and 142. The output voltage of the secondary of transformer 94 is rectified by diodes D1, D2, D3 and D4 to provide approximately 12 volts DC at terminals 96, 104 and 118. With third switch means 62 in the first position, terminal 98 is connected to terminal 116 and terminal 108 is connected to terminal 113 (see FIGS. 2b and 2c) by switch arms shown in phantom resulting in the approximately 12 volts DC being applied to the first and second switch means 58, 60 placing them in the first position. With first and second switch means 58, 60 being in the first position, the MAIN black of the shore power is connected to the front black (first energy consuming device 12) through terminals 124, 128. MAIN white of the shore power is connected to the front white (first energy consuming device 12) through terminal 132 resulting in the first energy consuming device 12 (front air conditioner) being energized. The second energy consuming device 14 (rear air conditioner) is not connected to an energized power source.

With the third switch means 62 in the second position, none of the terminals in the third switch means 62 (see FIG. 2c) is connected to any other terminal in the switch by the internal wipers or switch arms of the switch. Therefore neither the first or second switch means 58, 60 are energized and are in the second position with the MAIN black of the shore power being connected to the rear black (second energy consuming device 14) through terminals 124, 126. The MAIN white of the shore power is connected to the rear white (second energy consuming device 14) through 132, 130 resulting in the second energy consuming device 14 (rear air conditioner) being energized. The first energy consuming device 12 (front air conditioner) is not connected to an energized power source.

With the third switch means 62 in the third position, terminal 98 is connected to terminal 102 and terminal 108 is connected to terminal 122 (see FIGS. 2b and 2c) by switch arms shown in solid line resulting in the approximately 12 volts DC at terminal 96 being applied to terminal 100 and terminal 106 of first switch means 58 being connected to terminal 120 of fourth switch means 64. Second switch means 60 is not energized and is in the second position. The position of first switch means 58 is cycled between the first position and the second position by the action of fourth switch means 64 as follows.

The approximately 12 volts DC at terminal 100 is applied to voltage regulator 144 and capacitor 146. The output of voltage regulator 144 is applied via leads 145, 147 to timer means 56 whose output is applied to the base of transistor 65 through current limiting resistor 148. In the preferred embodiment, timer means 56 comprises a 555 timer chip 150 which is connected to operate as an astable multivibrator whose frequency and duty cycle are controlled by resistors 152 and 154 and timing capacitor 156. When the approximately five volt output of voltage regulator 144 is initially applied to the 555 timer chip 150, the output of the 555 timer chip 150 on lead 158 goes high and stays high (ON) for a first predetermined time of approximately eleven minutes, then goes low (OFF) for a second predetermined time of approximately five minutes, then goes high (ON) for a third predetermined time of approximately seven minutes, then goes low (OFF) for approximately five minutes and continues to cycle between the high (ON) and low (OFF) states as long as the output from the voltage regulator 144 is applied to the 555 timer chip 150. When the output of the 555 timer chip 150 goes high, the first switch means 58 is positioned to the first position and when the output of the 555 timer chip 150 goes low, the first switch means 58 is positioned to the second position. The second switch means 60 remains in the second position during the time the first switch means 58 is in the first position for approximately eleven minutes, in the second position for approximately five minutes, in the first position for approximately seven minutes and then cycles between the first position for approximately seven minutes and the second position for approximately five minutes.

When the first switch means 58 is in the first position and the second switch means 60 is in the second position, the 110 volt shore power is connected to the first energy consuming device 12 (front air conditioner) and the second energy consuming device 14 (rear air conditioner) is not connected to an energized power source. When the first switch means 58 is in the second position and the second switch means 60 is in the second position, the 110 volt shore power is connected to the second energy consuming device 14 (rear air conditioner) and the first energy consuming device 12 (front air conditioner) is not connected to an energized power source.

In summary, the possible choices of operation of the front and rear air conditioners when the motor home is connected to the shore power are as follows. When the third switch means 62 is in the first position, the front air conditioner (first energy consuming device 12) is energized. When the third switch means 62 is in the second position, the rear air conditioner (second energy consuming device 14) is energized. When the third switch means 62 is in the third position, the front air conditioner is energized for approximately eleven minutes, then the rear air conditioner is energized for approximately five minutes, then the front air conditioner is energized for approximately seven minutes and the front and rear air conditioners are cycled for the approximate five and seven minutes as set forth above. In this manner, the operator has a choice of which air conditioner is on and the time they are on so the operator may have the front of the motor home cooled, the rear of the motor home cooled or both the front and rear of the motor home cooled by cycling the on periods of the front and rear air conditioners.

When the on-board generator is used, the 110 volt auxiliary voltage is applied through the auxiliary circuit breaker 26 to the terminal block 52 and the 110 volt main voltage is applied through the main circuit breaker 22 to the terminal block 52 and to terminals 90 and 92 of power supply 54 and to the primary of transformer 94 (step-down transformer) and the input filter capacitors 138, 140 and 142. The output voltage of the secondary of transformer 94 is rectified by diodes D1, D2, D3 and D4 to provide approximately 12 volts DC at terminals 96, 104 and 118. With third switch means 62 in the first position, terminal 98 is connected to terminal 116 and terminal 108 is connected to terminal 113 (see FIGS. 2b and 2c) by switch arms shown in phantom resulting in the approximately 12 volts DC being applied to the first and second switch means 58, 60 placing them in the first position With first and second switch means 58, 60 being in the first position, the MAIN black of the on-board generator 36 is connected to the front black (first energy consuming device 12) through terminals 124, 128. MAIN white of the on-board generator 36 is connected to the front white (first energy consuming device 12) through terminal 132 resulting in the first energy consuming device 12 (front air conditioner) being energized. AUX white of the on-board generator 36 is connected to the rear white (second energy consuming device 14) through terminals 134, 130. AUX black of the on-board generator 36 is connected to rear black (second energy consuming device 14) through terminals 136, 126 resulting in the second energy consuming device 14 (rear air conditioner) being energized.

With the third switch means 62 in the second position, none of the terminals in the third switch means 62 (see FIG. 2c) is connected to any other terminal in the switch by the internal wipers or switch arms of the switch. Therefore neither the first or second switch means 58, 60 are energized and are in the second position with the MAIN black of the on-board generator 36 being connected to the rear black (second energy consuming device 14) through terminals 124, 126. The MAIN white of the on-board generator 36 is connected to the rear white (second energy consuming device 14) through 132, 130 resulting in the second energy consuming device 14 (rear air conditioner) being energized. The first energy consuming device 12 (front air conditioner) is not connected to an energized power source.

With the third switch means 62 in the third position, terminal 98 is connected to terminal 102 and terminal 108 is connected to terminal 122 (see FIG 2c) by switch arms shown in solid line resulting in the approximately 12 volts DC at terminal 96 being applied to terminal 100 and terminal 106 of first switch means 58 being connected to terminal 120 of fourth switch means 64. Second switch means 60 is not energized and is in the second position. The position of first switch means 58 is cycled between the first position and the second position by the action of fourth switch means 64 as follows.

The approximately 12 volts DC at terminal 100 is applied to voltage regulator 144 and capacitor 146. The output of voltage regulator 144 is applied to timer means 56 whose output is applied to the base of transistor 65 through current limiting resistor 148. In the preferred embodiment, timer means 56 comprises a 555 timer chip 150 which is connected to operate as an astable multivibrator whose frequency and duty cycle are controlled by resistors 152 and 154 and timing capacitor 156. When the approximately five volt output of voltage regulator 144 is initially applied to the 555 timer chip 150, the output of the 555 timer chip 150 on lead 158 goes high and stays high for a first predetermined time of approximately eleven minutes, then goes low for a second predetermined time of approximately five minutes, then goes high for a third predetermined time of approximately seven minutes, then goes low for a second predetermined time of approximately five minutes, then goes high for a third predetermined time of approximately seven minutes, then goes low for approximately five minutes and continues to cycle between the high and low states as long as the output from the voltage regulator 144 is applied to the 555 timer chip 150. When the output of the 555 timer chip 150 goes high, the first switch means 58 is positioned to the first position and when the output of the 555 timer chip 150 goes low, the first switch means 58 is positioned to the second position The second switch means 60 remains in the second position during the time the first switch means 58 is in the first position for approximately eleven minutes, in the second position for approximately five minutes, in the first position for approximately seven minutes and then cycles between the first position for approximately seven minutes and the second position for approximately five minutes.

When the first switch means 58 is in the first position and the second switch means 60 is in the second position, the 110 volt main phase of the on-board generator 36 is connected to the first energy consuming device 12 (front air conditioner) and the second energy consuming device 14 (rear air conditioner) is not connected to an energized power source. When the first switch means 58 is in the second position and the second switch means 60 is in the second position, the 110 volt main phase of the on-board generator 36 is connected to the second energy consuming device 14 (rear air conditioner) and the first energy consuming device 12 (front air conditioner) is not connected to an energized power source.

In summary, the possible choices of operation of the front and rear air conditioners when the motor home is connected to the on-board generator 36 is as follows. When the third switch means 62 is in the first position, both the front air conditioner (first energy consuming device 12) and the rear air conditioner (second energy consuming device 14) are energized. When the third switch means 62 is in the second position, the rear air conditioner (second energy consuming device 14) is energized. When the third switch means 62 is in the third position, the front air conditioner is energized for approximately eleven minutes, then the rear air conditioner is energized for approximately five minutes, then the front air conditioner is energized for approximately seven minutes and the front and rear air conditioners are cycled for the approximate five and seven minutes as set forth above. In this manner, the operator has a choice of which air conditioner is on and the time they are on so the operator may have both the front and the rear of the motor home cooled at the same time, the rear of the motor home cooled or both the front and rear of the motor home cooled by cycling the on periods of the front and rear air conditioners.

With reference to FIG. 2d, which replaces FIG. 2c in FIG. 3 for this embodiment a further embodiment is disclosed which provides the added feature of being able to control the operation of the front and rear air conditioners from more than one location by providing a fifth switch means 163 which may be substituted for the third switch means 62 by the operation and position of sixth switch means 165. In the preferred embodiment, fifth switch means 163 comprises a double-pole, double-throw, center-off switch like third switch means 62 while sixth switch means 165 comprises a double-pole, double-throw switch without a center position. In the preferred embodiment, third switch means 62a is located in the rear portion of the motor home near the bed while the fifth and sixth switch means 163, 165 are located in the front portion of the motor home near the driver position Third switch means 62a is substituted for third switch means 62 with terminal 98 being connected to terminal 176 of sixth switch means 165 and terminal 108 being connected to terminal 178 of sixth switch means 165. With sixth switch means 165 positioned in the first position (switch lever in the up position for LOCAL control near the driver position), the switch arms will be as shown in phantom and control will be at fifth switch means 163. Fifth switch means 163 will operate and control the position of the first and second switch means 58, 60 just as the operation and control of third switch means 62 was previously described. With sixth switch means 165 positioned in the second position (switch lever in the down position for REMOTE control near the bed), the switch arms will be as shown in solid line and control will be at the third switch means 62a. Third switch means 62a will then operate and control the position of the first and second switch means 58, 60 just as the operation and control of third switch means 62 was previously described.

In summary, when the embodiment is included which allows the operator of the motor home to control the operation of the front and rear air conditioners from more than one location (LOCAL or REMOTE control), the possible choices of operation of the front and rear air conditioners are as follows. When the sixth switch means 165 is positioned in the first position, control is provided by and to fifth switch means 163. When the sixth switch means 165 is positioned in the second position, control is provided by and to third switch means 62a.

Figure 5:
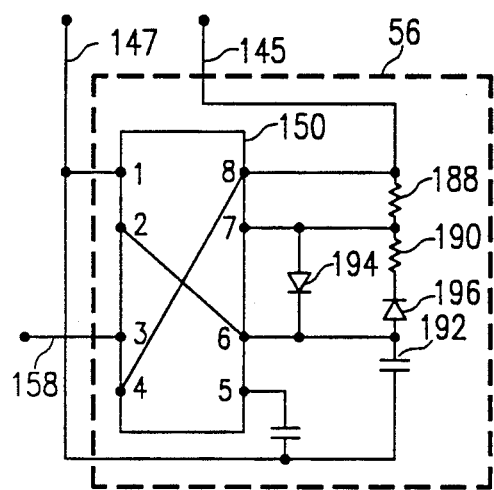
FIG. 5 is a simplified schematic diagram of another embodiment of the timer means of the present invention.

With reference to FIG. 5, another embodiment of timer means 56 is disclosed which eliminates the long initial on-time of the front air conditioner and independently controls the on and off times of the front and rear air conditioners In the preferred embodiment, timer means 56 comprises a 555 timer chip 150 which is connected to operate as an astable multivibrator whose frequency and duty cycle are controlled by resistors 188 and 190 and capacitor 192. When the 5 volts DC output of voltage regulator 144 is initially applied across leads 145 and 147, the output of the 555 timer chip 150 on lead 158 goes high and stays high for a fourth predetermined time (determined by the values of resistor 188 and capacitor 192), then goes low for a fifth predetermined time (determined by the values of resistor 190 and capacitor 192) and continues to cycle between the high and low states as long as the output from the voltage regulator 144 is applied to the 555 timer chip 150. The high or ON time is equal to 0.693 times the value of resistor 188 times the value of capacitor 192. The low or OFF time is equal to 0.693 times the value of resistor 190 times the value of capacitor 192. Capacitor 192 charges via resistor 188 and diode 194 and discharges via diode 196 and resistor 190.

Figure 6:
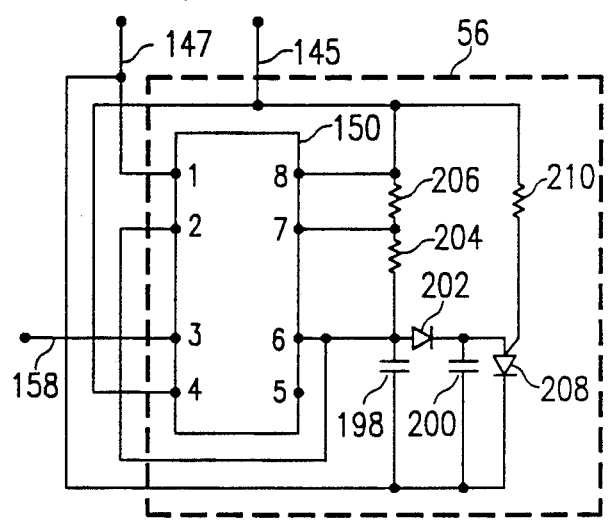
FIG. 6 is a simplified schematic diagram of yet another embodiment of the timer means of the present invention.

With reference to FIG. 6, another embodiment of timer means 56 is disclosed which provides a longer initial high (ON) time (first predetermined time) with subsequent low (OFF) (second predetermined time) and high (ON) (third predetermined time) cycle times. When the 5 volt DC output of voltage regulator 144 is initially applied across leads 145 and 147, the output of the 555 timer chip 150 on lead 158 goes high (ON) and stays high until the voltage on the timing capacitor 198 reaches $\frac{2}{3}$ of the 5 volts DC and the voltage on capacitor 200 reaches $\frac{2}{3}$ of the 5 volts DC minus the one diode voltage drop of diode 202. The charging path for timing capacitor 198 being through resistors 204 and 206 while the charging path for capacitor 200 is through resistors 204 and 206 and diode 202. Only timing capacitor 198 contributes to the OFF and ON cycle times. Capacitor 200, after being charged, remains isolated by diode 202 (which is reversed biased) and unijunction transistor 208, which has the 5 volts DC supply voltage applied to its gating terminal (emitter) through resistor 210. Capacitor 200 is discharged through unijunction transistor 208 when the 5 volt supply voltage is removed. When the voltage at terminal 6 of the 555 timer chip 56 reaches ⅔ of the 5 volts DC, timing capacitor 198 is discharged to ⅓ of the 5 volts DC through resistor 204 to determine the OFF (low) cycle time. The ON (high) cycle time is then determined by the time required for timing capacitor 198 to charge from ⅓ to ⅔ of the 5 volt DC through resistors 204 and 206.

Figure 7:
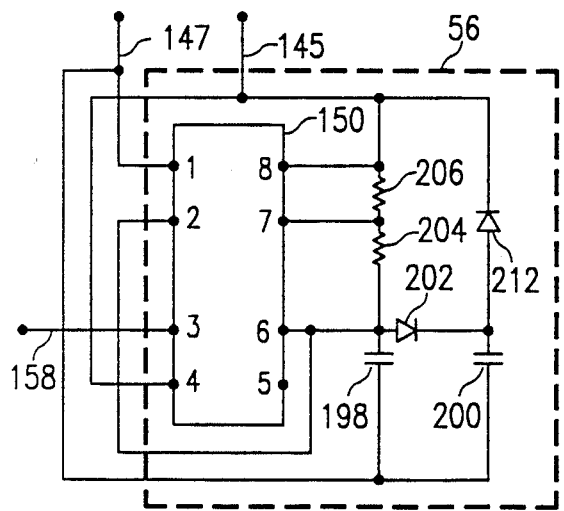
FIG. 7 is a simplified schematic diagram of still another of the timer means of the present invention.

With reference to FIG. 7, another embodiment of the timer means 56 is disclosed which provides a longer initial ON (high) time (first predetermined time) with subsequent OFF (low) and ON (high) cycle times. When the 5 volt DC output of the voltage regulator 144 is initially applied across leads 145 and 147, the output of the 555 timer chip 56 on lead 158 goes high (ON) and stays high (ON) until the voltage on the timing capacitor 198 reaches ⅔ of the 5 volt DC supply voltage and the voltage on capacitor 200 reaches ⅔ of the 5 volt DC supply voltage minus the one diode voltage drop of diode 202. The charging path for timing capacitor 198 being through resistors 204 and 206 while the charging path for capacitor 200 is through resistors 204 and 206 and diode 202. Only timing capacitor 198 contributes to the OFF and ON cycle times. Capacitor 200, after being charged, remains isolated by diode 202 (which is reverse biased) and diode 212 (which has the 5 volts DC applied to the cathode thereof). Capacitor 200 will be discharged through diode 212 when the 5 volt DC supply voltage is removed. When the voltage at terminal 6 of the 555 timer chip 56 reaches ⅔ of the 5 volts DC, timing capacitor 198 is discharged to ⅓ of the 5 volts DC through resistor 204 to determine the OFF cycle time. The ON cycle time is then determined by the time required for timing capacitor 198 to charge from ⅓ to ⅔ of the 5 volts DC through resistors 204 and 206.

Figure 8:
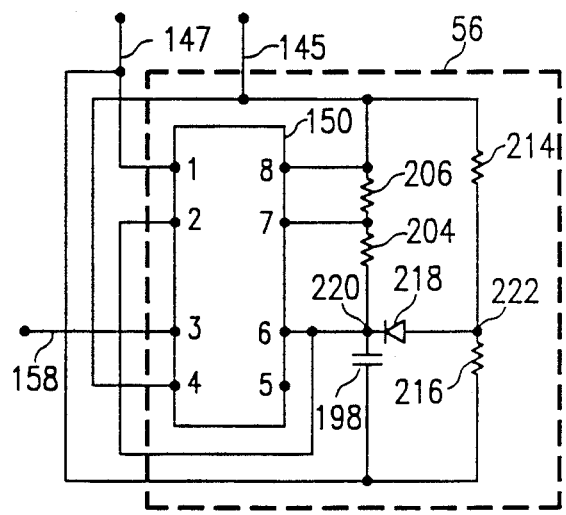
FIG. 8 is a simplified schematic diagram of another embodiment of the timer means of the present invention.

With reference to FIG. 8, another embodiment of the timer means 56 is disclosed which provides a shorter initial ON (high) time with subsequent OFF (low) and ON (high) cycle times. When the 5 volt DC output of voltage regulator 144 is is initially applied across leads 145 and 147, the output of the 555 timer chip 150 on lead 158 goes high and the voltage divider network comprising resistors 214 and 216 together with diode 218 causes the timing capacitor 198 to initially charge very rapidly to the voltage applied to terminal 220 from terminal 222. The ratio of the values of resistors 214 and 216 is chosen such that the voltage at terminal 220 (taking into account the voltage drop introduced by diode 218) is a desired value (which is dependent upon the amount of initial ON time desired) between zero and ⅓ of the 5 volt DC supply voltage. After the initial fast charge through the voltage divider network and diode 218, timing capacitor 198 continues to charge toward ⅔ of the 5 volts DC through resistors 204 and 206. When the voltage on the timing capacitor 198 (terminal 220) reaches ⅔ of the 5 volts DC, the output on lead 158 goes low (OFF) and timing capacitor 198 is discharged to ⅓ of the 5 volts DC through resistor 204 to pin 7 of the 555 timer chip 150.

Figure 9:
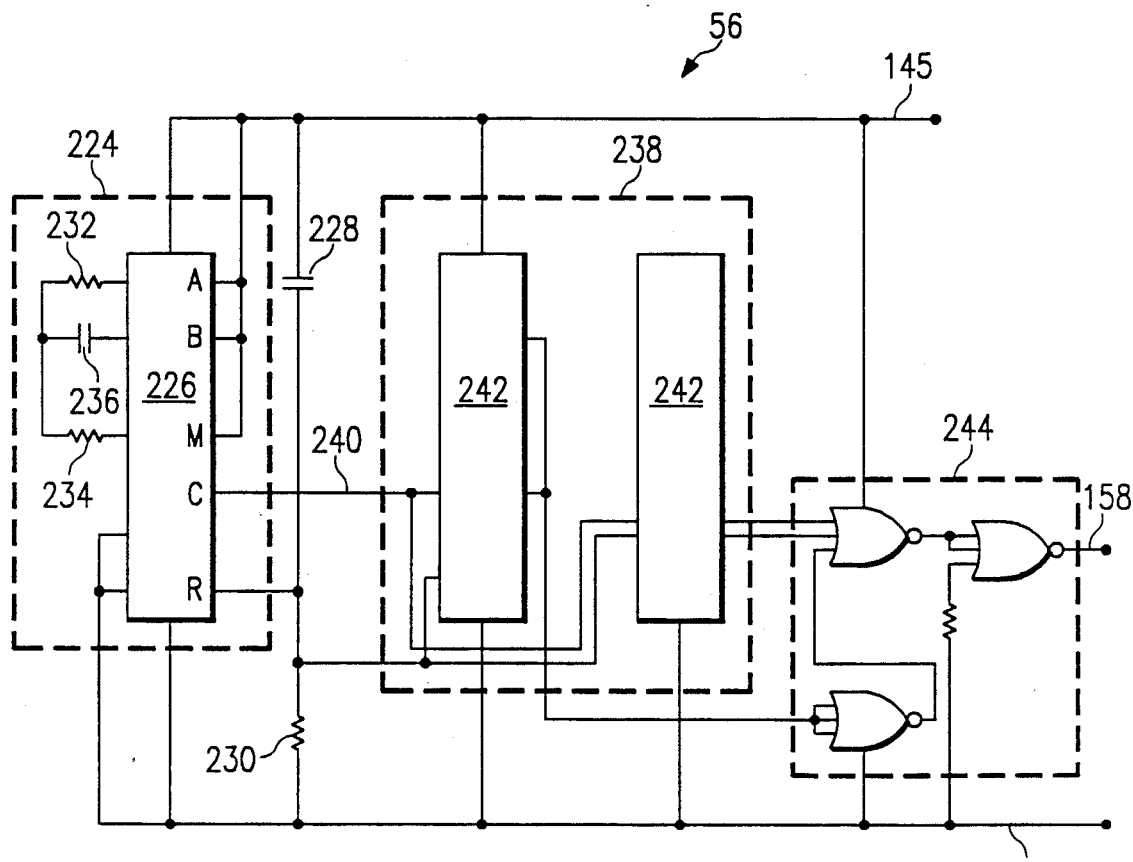
FIG. 9 is a simplified schematic diagram of yet another embodiment of the timer means of the present invention.

With reference to FIG. 9, another embodiment of timer means 56 is disclosed which embodies digital circuitry. The 5 volt DC output of the voltage regulator 144 is applied to clock means 224. In the preferred embodiment, clock means 224 is a CMOS 24 ST frequency divider 226 (MC-14521). The initial ON time (first predetermined time) is determined by capacitor 228 and resistor 230. The clock rate of clock means 224 is determined by resistors 232 and 234 and capacitor 236. Counter means 238 receives the output signal from clock means 224 on lead 240. In the preferred embodiment, counter means 238 comprises a CMOS dual binary up-counter chip 242 (MC-14520) and the cycle OFF time and the cycle ON time are determined by counter means 238 by dividing down the clock rate of clock means 224. The output of the timer means 56 is output on lead 158 through gating means 244.

Thus it is apparent that there has been provided in accordance with this invention, a method and apparatus for allowing the operator of a motor home to operate both the front and rear air conditioner in the motor home even though the motor home is connected to the shore power at a trailer park by cycling the application of power between the front and rear air conditioners. In addition, the operator of the motor home may cycle the application of power between the front and rear air conditioners even when connected to the on-board generator and thereby reduce the required power output of the on-board generator.

Although the invention has been described herein with reference to specific forms thereof, it is evident that many alternatives, modifications and variations will become apparent to those skilled in the art in light of the foregoing disclosure. Accordingly, this description is to be construed as illustrative only and is for the purpose of teaching those skilled in the art the manner of carrying out the invention. It is to be understood that the forms of the invention herewith shown and described are to be taken as presently preferred embodiments. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc., may be made without departing from the spirit and scope of the invention as defined by the appended claims.

What is claimed is:

1. Apparatus for controlling the application of electrical power from a selected one of a first and a second source of electrical power to a first and a second energy consuming device, said apparatus comprising:

first and second switch means structured to be positioned in either a first position or a second position and operatively connected between the first and second sources of electrical power and the first and second energy consuming devices such that when said first switch means is in a first position and said second switch means is in a first position said first source of electrical power will be connected to said first energy consuming device when said first source of electrical power is selected and said second source of electrical power will be connected to said first and second energy consuming devices when said second source of electrical power is selected, when said first switch means is in a second position and said second switch means is in a second position said first source of electrical power will be connected to said second energy consuming device when said first source of electrical power is selected and said second source of electrical power will be connected to said second energy consuming device when said second source of electrical power is selected, when said first switch means is in a first position and said second switch means is in a second position said first source of electrical power will be connected to said first energy consuming device when said first source of electrical power is selected and said second source of electrical power will be connected to said first energy consuming device when said second source of electrical power is selected; and third switch means structured to be positioned in either a first position, a second position or a third position and operatively connected to said first and second switch means to control the position of said first and second switch means such that when said third switch means is positioned in said first position, said first switch means is positioned to said first position and said second switch means is positioned to said first position, when said third switch means is positioned in said second position, said first switch means is positioned to said second position and said second switch means is positioned to said second position, when said third switch means is positioned in said third position, said first switch means is positioned to said second position and said second switch means is positioned to said second position.

2. The apparatus of claim 1 further including fourth switch means structured to be positioned in either a first position or a second position and operatively connected to said first switch means to position said first switch means to said second position when said fourth switch means is positioned in said first position and to position said first switch means to said first position when said fourth switch means is positioned in said second position.

3. The apparatus of claim 2 further including timer means operatively connected to said fourth switch means to position said fourth switch means in said second position for a first predetermined time, then in said first position for a second predetermined time, then in said second position for a third predetermined time and then cycle said fourth switch means between said first position for a second predetermined time and said second position for a third predetermined time.

4. The apparatus of claim 3 wherein said first predetermined time is approximately eleven minutes.

5. The apparatus of claim 3 wherein said second predetermined time is approximately five minutes.

6. The apparatus of claim 3 wherein said third predetermined time is approximately seven minutes.

7. The apparatus of claim 3 further including a power supply operatively connected to said third switch means and said timer means to supply a DC output voltage to said timer means when said third switch means is positioned to said third position.

8. The apparatus of claim 3 wherein said timer means includes a 555 timer chip and a first series circuit comprising a first resistor, a second resistor and a first capacitor operatively connected across terminals one and four of the 555 timer chip with the connection between the second resistor and the first capacitor being connected to the threshold terminal of the 555 timer chip, a second series circuit operatively connected across said first capacitor, said second series circuit comprising a first diode and a second capacitor with the anode terminal of said first diode operatively connected to the connection between the second resistor and the first capacitor.

9. The apparatus of claim 8 further including a unijunction transistor connected in parallel with said second capacitor with base 1 operatively connected to the connection between said first diode and said second capacitor and base 2 operatively connected to terminal one of the 555 timer chip, the emitter terminal of said unijunction transistor operatively connected to terminal four of the 555 timer chip.

10. The apparatus of claim 8 further including a second diode operatively connected between the connection of the first diode and the second capacitor and terminal four of the 555 timer chip with the cathode terminal of the second diode connected to terminal four of the 555 timer chip.

11. The apparatus of claim 3 wherein said timer means includes a 555 timer chip and a first series circuit comprising a first resistor, a second resistor and a first capacitor operatively connected across terminals one and four of the 555 timer chip with the connection between the second resistor and the first capacitor connected to the threshold terminal of the 555 timer chip, a third series circuit operatively connected across terminals one and four of the 555 timer chip and in parallel with said first series circuit, said third series circuit comprising a third resistor and a fourth resistor, a third diode operatively connected between the connection between the second resistor and the first capacitor and the connection between the third resistor and the fourth resistor, the anode terminal of said second diode operatively connected to the connection between the third resistor and the fourth resistor.

12. The apparatus of claim 2 further including timer means operatively connected to said fourth switch means to position said fourth switch means in said second position for a fourth predetermined time, then in said first position for a fifth predetermined time and then cycle said fourth switch means between said second position for said fourth predetermined time and said first position for said fifth predetermined time.

13. The apparatus of claim 12 wherein said timer means includes a 555 timer chip and a first series circuit comprising a first resistor, a second resistor, a first diode and a capacitor connected across terminals one and eight of the 555 timer chip with the connection between the first resistor and the second resistor connected to terminal seven of the 555 timer chip and the connection between the first diode and the capacitor connected to terminal six of the 555 timer chip with the anode of the first diode connected to terminal six of the 555 timer chip, a second diode connected between terminals six and seven of the 555 timer chip with the anode connected to terminal seven.

14. The apparatus of claim 12 wherein said timer means comprises gating means structured to generate a predetermined signal to be input to said fourth switch means upon receipt of a control signal, counter means structured to receive a clock signal of a predetermined frequency and to provide said control signal to said gating means, clock means structured to generate said clock signal of a predetermined frequency upon receiving the application of a DC voltage of predetermined value and operatively connected to said counter means to provide said clock signal of a predetermined frequency thereto.

15. The apparatus of claim 1 wherein said first and second switch means each comprise a double-pole, double-throw relay.

16. The apparatus of claim 1 wherein said third switch means comprises a double-pole, double-throw, center-off switch.

17. The apparatus of claim 2 wherein said fourth switch means comprises a transistor.

18. The apparatus of claim 1 further including fifth switch means structured to be positioned in either a first position, a second position or a third position and a sixth switch means structured to be positioned in either a first position or a second position, said fifth switch means operatively connected to said third switch means through said sixth switch means when said sixth switch means is positioned in said second position such that when said fifth switch means is positioned in said first position, said first switch means is positioned to said first position and said second switch means is positioned to said first position, when said fifth switch means is positioned in said second position, said first switch means is positioned to said second position and said second switch means is positioned to said second position and when said fifth switch means is positioned to said third position, said first switch means is positioned to said second position and said second switch means is positioned to said second position and third switch means does not control the positions of said first and second switch means and when said sixth switch means is positioned in said first position then said fifth switch means does not control said first and second switch means and said third switch means controls the positions of said first and second switch means such that when said third switch means is positioned in said first position, said first switch means is positioned to said first position and said second switch means is positioned to said first position, when said third switch means is positioned in said second position, said first switch means is positioned to said second position and said second switch means is positioned to said second position, when said third switch means is positioned in said third position, said first switch means is positioned to said second position and said second switch means is positioned to said second position.

19. The apparatus of claim 18 wherein said fifth switch means comprises a double-pole, double-throw, center-off switch.

20. The apparatus of claim 18 wherein said sixth switch means comprises a double-pole, double-throw, switch.

21. The apparatus of claim 1 wherein said first source of electrical power comprises shore power at a trailer park.

22. The apparatus of claim 1 wherein said second source of electrical power comprises the on-board generator of a motor home.

23. The apparatus of claim 1 wherein said first energy consuming device comprises a front air conditioner.

24. The apparatus of claim 1 wherein said second energy consuming device comprises a rear air conditioner.

25. A method of controlling the application of electrical power from a selected one of a first and a second source of electrical power to a first and a second energy consuming device, said method comprising the steps of:
providing apparatus for controlling which includes first and second switch means structured to be positioned in either a first or a second position and operatively connected between the first and second sources of electrical power and the first and second energy consuming devices and third switch means structured to be positioned in either a first position, a second position or a third position and operatively connected to said first and second switch means to control the position of said first and second switch means;
selecting one of two possible sources of electrical power comprising said first source of electrical power and said second source of electrical power; and
selectively positioning said third switch means in one of three possible positions comprising said first position, said second position and said third position whereby said first switch means is positioned to said first position and said second switch means is positioned to said first position if said third switch means is positioned to said first position and then said first source of electrical power is operatively connected to said first energy consuming device if said first source of electrical power is selected and said second source of electrical power is operatively connected to said first energy consuming device and said second energy consuming device if said second source of electrical power is selected, said first switch means is positioned to said second position and said second switch means is positioned to said second position if said third switch means is positioned to said second position and then said first source of electrical power is operatively connected to said second energy consuming device if said first source of electrical power is selected and said second source of electrical power is operatively connected to said second energy consuming device if said second source of electrical power is selected, said first switch means is positioned to said second position and said second switch means is positioned to said second position if said third switch means is positioned to said third position and then said first source of electrical power is operatively connected to said second energy consuming device if said first source of electrical power is selected and said second source of electrical power is operatively connected to said second energy consuming device if said second source of electrical power is selected.

26. The method according to claim 25 further including the steps of:
providing fourth switch means structured to be positioned in either a first position or a second position and operatively connected to said first switch means to position said first switch means to said second position when said fourth switch means is positioned to said first position and to position said first switch means to said first position when said fourth switch means is positioned to said second position; and
providing timer means operatively connected to said fourth switch means to position said fourth switch means in said second position for a first predetermined time, then in said first position for a second predetermined time, then in said second position for a third predetermined time and then cycle said fourth switch means between said first position for a second predetermined time and said second position for a third predetermined time when said third switch means is positioned in said third position.

27. The method according to claim 26 wherein said first predetermined time is approximately eleven minutes.

28. The method according to claim 26 wherein said second predetermined time is approximately five minutes.

29. The method according to claim 26 wherein said third predetermined time is approximately seven minutes.

30. The method according to claim 25 wherein said first source of electrical power comprises shore power at a trailer park.

31. The method according to claim 25 wherein said second source of electrical power comprises an on-board generator in a motor home.

32. The method according to claim 25 wherein said first energy consuming device comprises an air conditioner in the front portion of a motor home.

33. The method according to claim 25 wherein said second energy consuming device comprises an air conditioner in the rear portion of a motor home.

* * * * *